Figure 1:
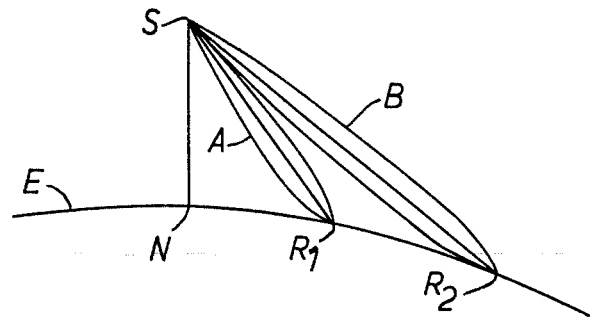

United States Patent [19]
Blythe

[11] 4,253,098
[45] Feb. 24, 1981

[54] RADAR SYSTEMS

[75] Inventor: John H. Blythe, Chelmsford, England

[73] Assignee: The Marconi Company Limited, Chelmsford, England

[21] Appl. No.: 77,031

[22] Filed: Sep. 19, 1979

[30] Foreign Application Priority Data

Oct. 26, 1978 [GB] United Kingdom ............... 42085/78

[51] Int. Cl.³ .............................................. G01S 13/89
[52] U.S. Cl. ................................................ 343/5 CM
[58] Field of Search ..................................... 343/5 CM

[56] References Cited

U.S. PATENT DOCUMENTS 3,007,155  10/1961  Petrides et al. ............... 343/5 CM X
3,296,579  1/1967   Farr et al. ..................... 343/5 CM X Primary Examiner—T. H. Tubbesing
Attorney, Agent, or Firm—Diller, Ramik & Wight

[57] ABSTRACT

A synthetic aperture radar system is provided in which the receive beam is controlled as to its directivity so that it moves over a required swathe in accordance with the direction of reflection of an interrogating radar pulse over that swathe. In a specific example a receiving array of linear feeds has its outputs connected to respective variable phase shifters which are controlled in dependence upon the predicted relationship between the direction from which reflected energy due to a transmitted pulse will be received and the time elapsed from the transmission of said pulse. The outputs from the variable phase shifters are combined and applied to a receiver.

7 Claims, 3 Drawing Figures

RADAR SYSTEMS

This invention relates to radar systems and in particular to so called synthetic aperture radar systems utilised on flying machines, which term is to be understood to include both airborne machines and space craft including satellites.

It is standard practice in synthetic aperture radar systems to design the antenna beamwidth in the roll plane (i.e. perpendicular to the platform line of sight) to embrace the required swathe width. This imposes a limitation on the achieveable antenna gain and places constraints on the overall system design which are particularly severe for satellite borne systems.

One object of the present invention is to provide an improved synthetic aperture radar system in which the above difficulty is mitigated.

According to this invention, a synthetic aperture radar system is provided wherein the receive beam of said system is controlled such that its directivity moves over a required swathe in accordance with the directivity of reflections over said swathe of a radar pulse transmitted over said swathe.

The present invention thus employs different beamwidths in transmit and receive and it is possible to realise a higher gain on receive, since at any given instant the angular spread of signals is small and known.

Preferably an array of linear feeds is provided in respect of said receive beam, the outputs of which are connected to respective variable phase shifters, the individual phase shifts of which are arranged to be controlled in dependence upon the predicted relationship between the directions from which reflected energy due to a transmitted pulse are received and the time which has elapsed from the transmission of said radar pulse, means being provided for combining the outputs from said variable phase shifters and applying the signals thus combined to a receiver.

The means for controlling the different variable phase shifters in order to effect the required steering of the received beam may be a read only memory store programmed to provide the required control signals at regular intervals of time under the control of a clock oscillator which is triggered as said radar pulse is transmitted. In other embodiments of the invention said means for controlling said variable phase shifters comprises a computer programmed to compute the required control signals for said variable phase shifters as a function of the time from the transmission of said radar pulse taking into account the altitude of a flying machine carrying said system, the computer pointing angle and the required swathe.

By "beam pointing angle" is meant the instantaneous direction of the receive beam.

The linear feeds in said array of linear feeds in one example of the invention each comprises a slotted waveguide. In other examples of the present invention, the linear feeds in said array of linear feeds may each comprise a meander line.

Figure 2:
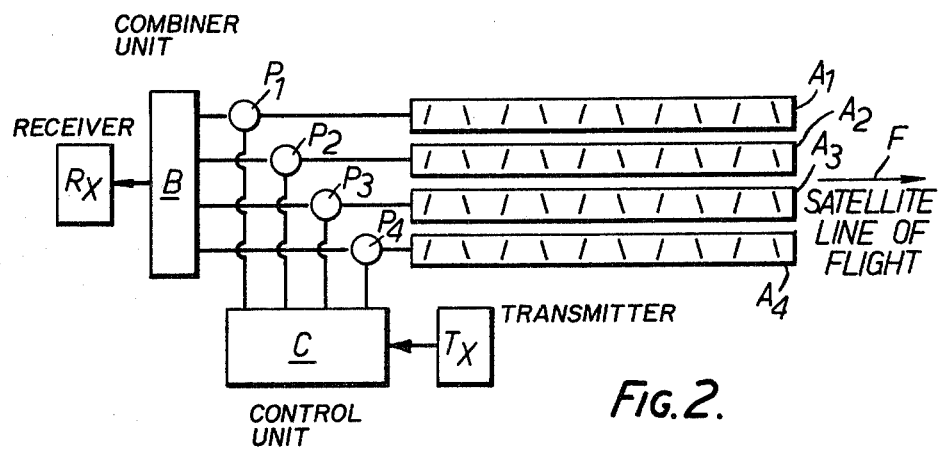
Figure 3:
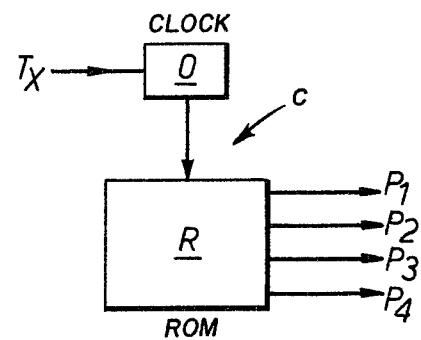

The invention is illustrated in and further described with reference to the accompanying drawing in which, FIG. 1 is a diagrammatic illustration of the operation of a synthetic aperture radar system in accordance with the present invention, FIG. 2 schematically illustrates a preferred system in accordance with the present invention and FIG. 3 is the block schematic diagram illustrating the nature of the control unit of FIG. 2.

Referring to FIG. 1, the system in this case is one carried by a satellite and the satellite radar platform is represented by S. It should be assumed that the satellite radar platform S is travelling perpendicular to the plane of the drawing. The earth surface is represented at E. The earth surface directly below the radar platform S is represented at N, whilst $R_1$ and $R_2$ represent the limits of the strip on the earth surface, which the radar system is required to image. That is to say, $R_1$, $R_2$ is the required swathe. In prior practice, it would be necessary for the radar to launch energy over the whole extent of $R_1$, $R_2$ requiring the transmitting beamwidth to be at least equal to the angle $R_1$, S, $R_2$. The receiver beam would naturally be required to have the same beamwidth. In the present system, however, a narrower beam is utilised for reception whose direction changes during the time in which reflected energy is received. In FIG. 1, the receive beam is shown in its two limiting positions A and B directed at either edge of the swathe $R_1$, $R_2$. When energy is received from $R_1$, the beam is arranged to be in position A. The beam is then steered towards position B in sympathy with the direction of energy reflected from the earth's surface E, the beam reaching position B when energy reflected from $R_2$ is received at the satellites.

Referring to FIG. 2, the radar system carried by the satellite radar platform S in FIG. 1 consists of an array of linear feeds $A_1$ to $A_N$, where $N_1=4$ in FIG. 2 is purely for illustrative purposes. Each linear feed $A_1$ to $A_N$ is constructed as shown per se, in this present case as a slotted waveguide as represented. The array of linear feeds $A_1$ to $A_N$ is orientated as shown with the line of flight of the satellite represented by the arrow F.

The outputs of the linear feeds $A_1$ to $A_4$ are fed to respective variable phase shifters $P_1$ to $P_4$, which are also as known per se and in this example use ferrite components. The control signals for the phase shifters $P_1$ to $P_4$ are provided by a control unit C, which is connected to receive a pulse from the radar transmitter $T_X$ at the instant of emission of the radar pulse. The control unit C is provided to compute the phase shifts required of the variable phase shifters $P_1$ to $P_4$ in order to steer the beam correctly at any instant.

The outputs of the phase shifters $P_1$ to $P_4$ are combined in a combiner unit B, which is constructed in accordance with known principles, in this case using hybrid circuits. The output of the combiner unit B is applied to the radar received represented at $R_X$.

Referring to FIG. 3, the control unit C of FIG. 2 consists of an oscillator, O, which produces clock pulses at regular intervals following the receipt of the trigger pulses from the transmitter $T_X$ of FIG. 2 indicating the instant of emission of the radar pulse by a transmitter $T_X$. The clock pulses produced by oscillator O are applied to a read only memory store R, which is preprogrammed with the required control signals for the variable phase shifters $P_1$ to $P_4$ of FIG. 2 at the regular intervals which are read out under the control of the clock pulses from oscillator O. The control signals applied to the variable phase shifters $P_1$ to $P_4$ then achieve the required steering effect already described with reference to FIGS. 1 and 2.

The system described above using as it does a simple read only memory system is particularly suitable for use on satellite orbiting at a fixed height from earth. As will be appreciated, a flexible system may be provided utilising a computer which is programmed to compute the control signals for the phase shifters $P_1$ to $P_4$ as a function of time from pulse transmission by the transmitter $T_X$ taking into account such information as height, beam-pointing angle and the required swathe.

I claim:

1. A synthetic aperture radar system wherein the receive beam of said system is controlled such that its directivity moves over a required swathe in accordance with the directivity of reflections over said swathe of a radar pulse transmitted over said swathe, said system comprising an array of linear feeds provided in respect of said receive beam, the outputs of which are connected to respective variable phase shifters, the individual phase shifts of which are arranged to be controlled in dependence upon the predicted relationship between the directions from which reflected energy due to a transmitted pulse are received and the time which has elapsed from the transmission of said radar pulse, means being provided for combining the outputs from said variable phase shifters and applying the signals thus combined to a receiver.

2. A system as claimed in claim 1 and wherein the means for controlling the different variable phase shifters in order to effect the required steering of the received beam is a read only memory store programmed to provide the required control signals at regular intervals of time under the control of a clock oscillator which is triggered as said radar pulse is transmitted.

3. A system as claimed in claim 1 and wherein said means for controlling said variable phase shifters comprises a computer programmed to compute the required control signals for said variable phase shifters as a function of the time from the transmission of said radar pulse taking into account the altitude of a flying machine carrying said system, the computer pointing angle and the required swathe.

4. A system as claimed in claim 1 and wherein the linear feeds in said array of linear feeds each comprise a slotted waveguide.

5. A system as claimed in claim 1 and wherein the linear feeds in said array of linear feeds each comprise a meander line.

6. A synthetic aperture radar system comprising means for transmitting a radar pulse signal, a receive beam system which is electronically scannable such that its directivity may move over a required swathe and means for controlling the electronic scanning of said receive beam system in dependence upon the predicted relationship between the directions from which reflected energy due to a transmitted pulse are received within said swathe and the time which has elapsed from the transmission of said pulse.

7. In a radar system carried by a flying machine, including means for illuminating a swath of surface below the machine with a relatively wide beam of transmitted pulse energy, which swath extends within a plane essentially perpendicular to the line of flight of the machine but displaced from that point on the surface directly below the machine, the improvement which comprises:

electronically scannable antenna means carried by said machine for receiving a succession of relatively narrow receive beams, the instantaneous directions of which receive beams correspond to successive portions of said swath; and electronic scanning means for controlling said antenna means to receive said succession of relatively narrow receive beams during successive intervals of time which have elapsed from the transmission of said pulse.

* * * * *